(12) United States Patent
Missotten et al.

(10) Patent No.: US 6,185,990 B1
(45) Date of Patent: Feb. 13, 2001

(54) METHOD OF MEASURING CROP HUMIDITY IN A HARVESTER

(75) Inventors: Bart M. A. Missotten, Leuven; Gilbert J. I. Strubbe, Loppem, both of (BE)

(73) Assignee: New Holland North America, Inc., New Holland, PA (US)

( * ) Notice: Under 35 U.S.C. 154(b), the term of this patent shall be extended for 0 days.

(21) Appl. No.: 09/314,392

(22) Filed: May 19, 1999

(30) Foreign Application Priority Data

May 26, 1998 (GB) .................................................. 9811177

(51) Int. Cl.[7] ............................ G01N 25/56; G01N 5/02; A01D 75/28
(52) U.S. Cl. .................... 73/73; 56/10.2 A; 56/10.2 B; 56/10.2 C; 324/691
(58) Field of Search ........................... 73/73; 56/10.2 B, 56/10.2 A, 10.2 C; 324/691

(56) References Cited

U.S. PATENT DOCUMENTS 5,871,397 * 2/1999 Nelson et al. ..................... 56/10.2 B
5,934,997 * 8/1999 Nelson et al. ..................... 56/10.2 B

FOREIGN PATENT DOCUMENTS 2304910   3/1997   (GB) .
8605353   9/1986   (WO) .

* cited by examiner

*Primary Examiner*—Hezron Williams
*Assistant Examiner*—Dennis Loo
(74) *Attorney, Agent, or Firm*—Larry W. Miller; J. William Stader

(57) ABSTRACT

A method of assessing the humidity or moisture content of crop is provided for an agricultural harvester for use during harvesting operations. The method involves harvesting a field using a harvesting machine equipped with a moisture sensor for monitoring the moisture content of the harvested crop and a mass flow rate sensor for monitoring the mass flow rate of crop material in the harvesting machine. The raw moisture data derived from the signal of the moisture sensor are combined with the mass flow rate data for establishing the actual moisture content of the crop material. This moisture data can be used to establish a moisture content map for the field, which has the advantage of identifying field spots with weed infection.

17 Claims, 14 Drawing Sheets

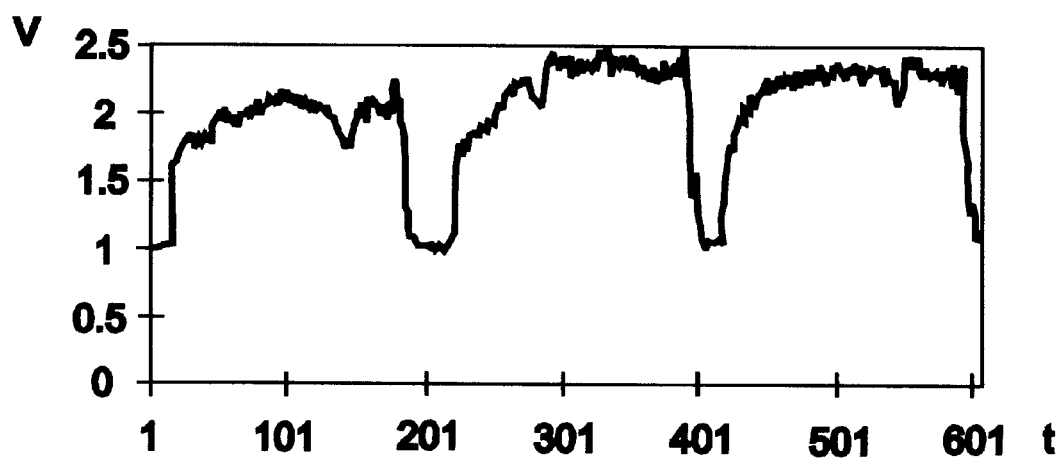
Fig. 9.A
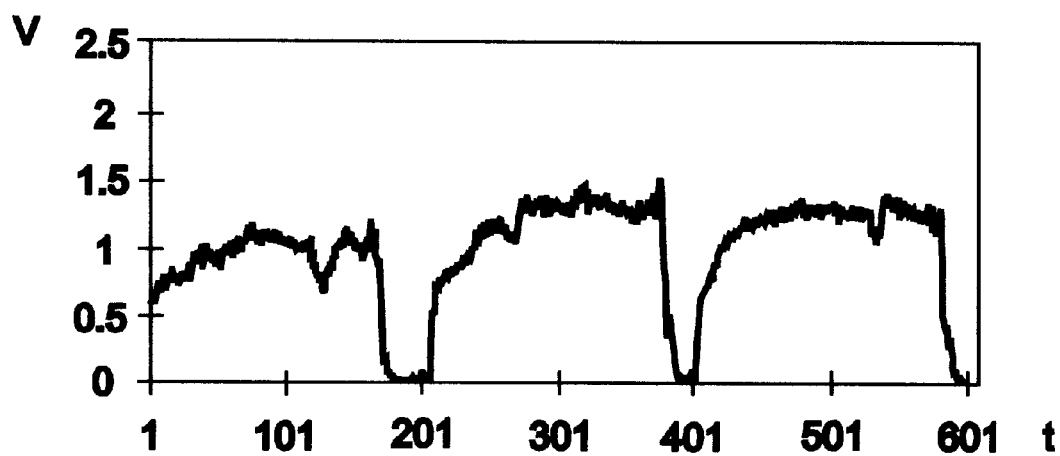
Fig. 9.B

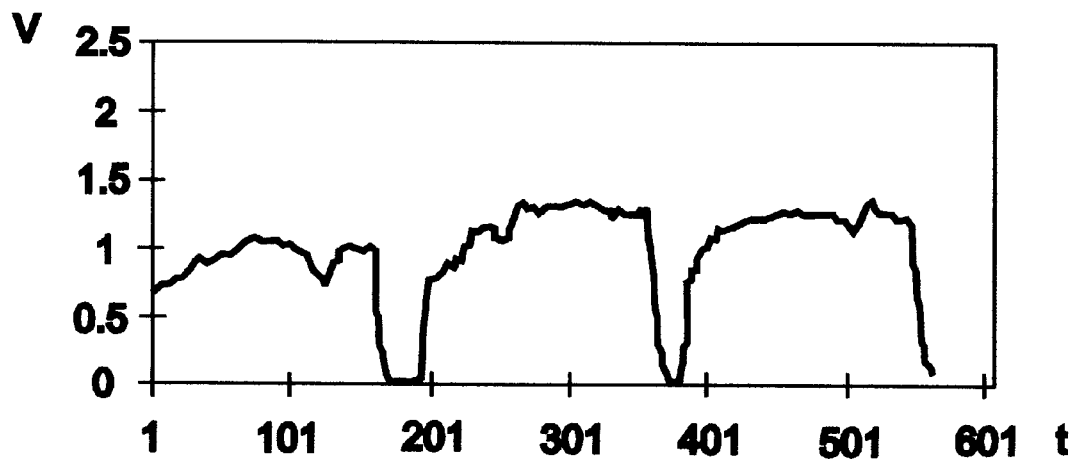
Fig. 9.C
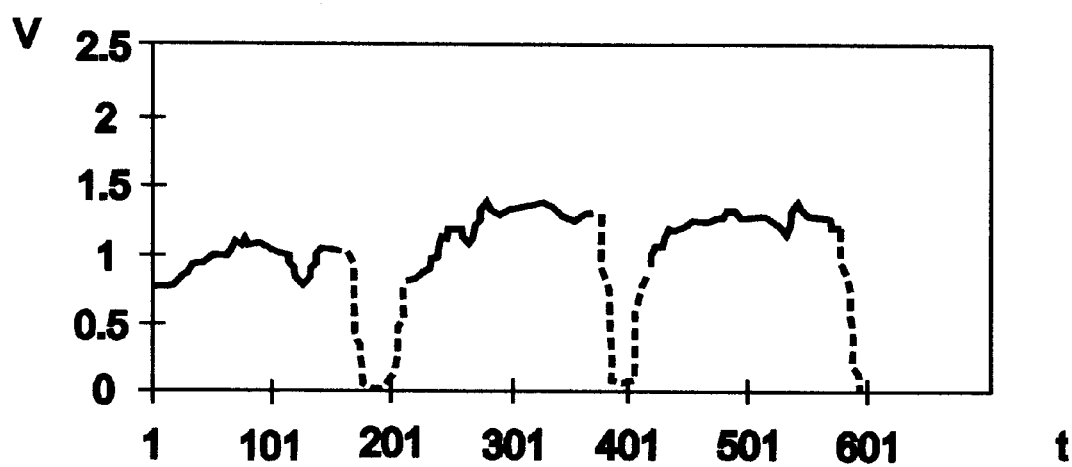
Fig. 9.D

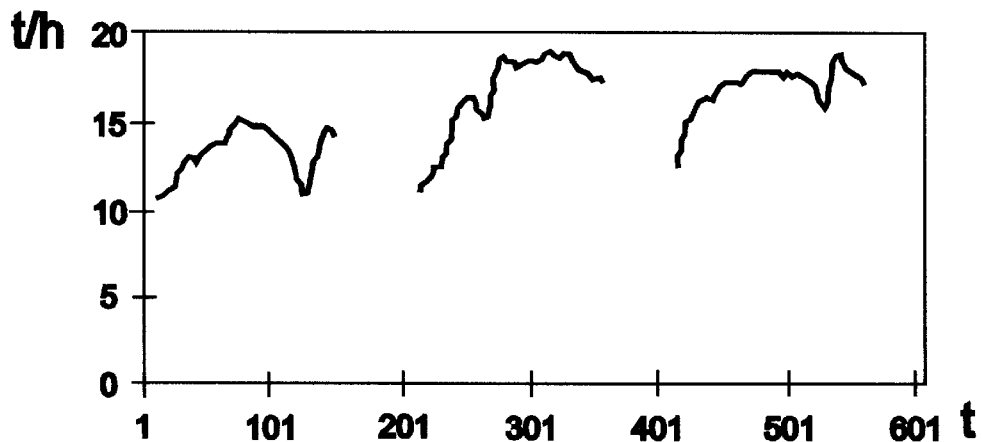
Fig. 9.E
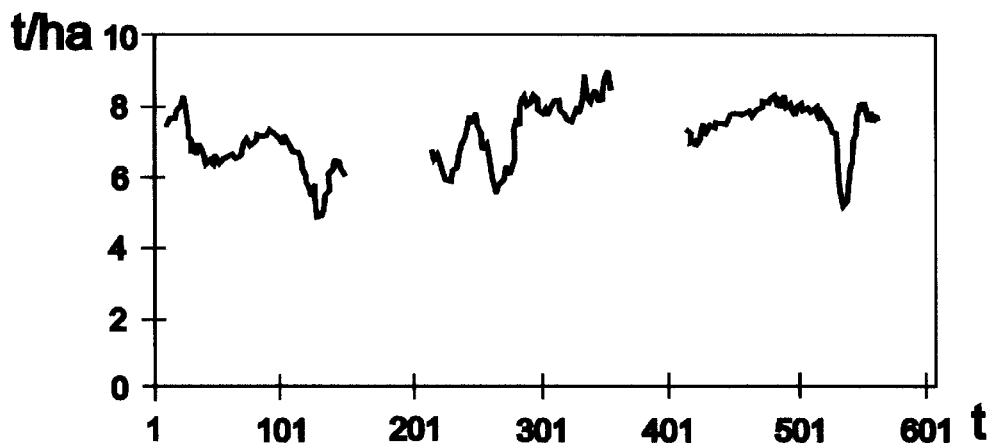
Fig. 9.F

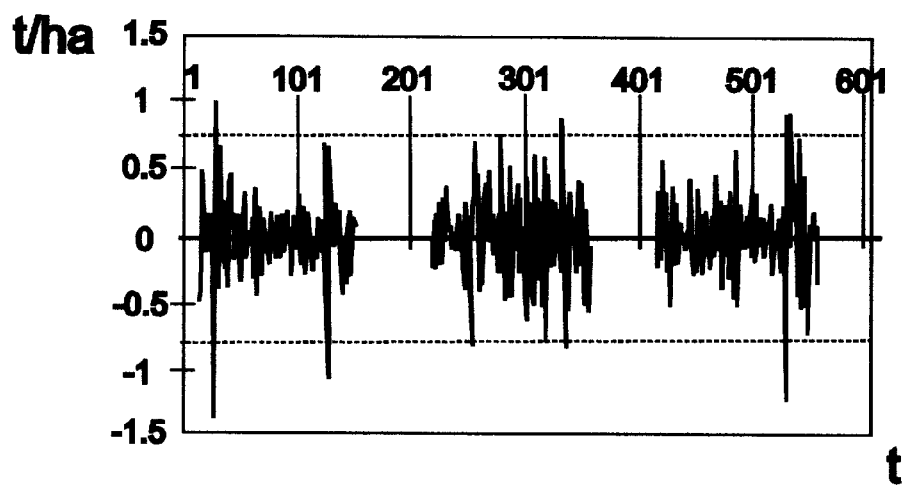
Fig. 9.G
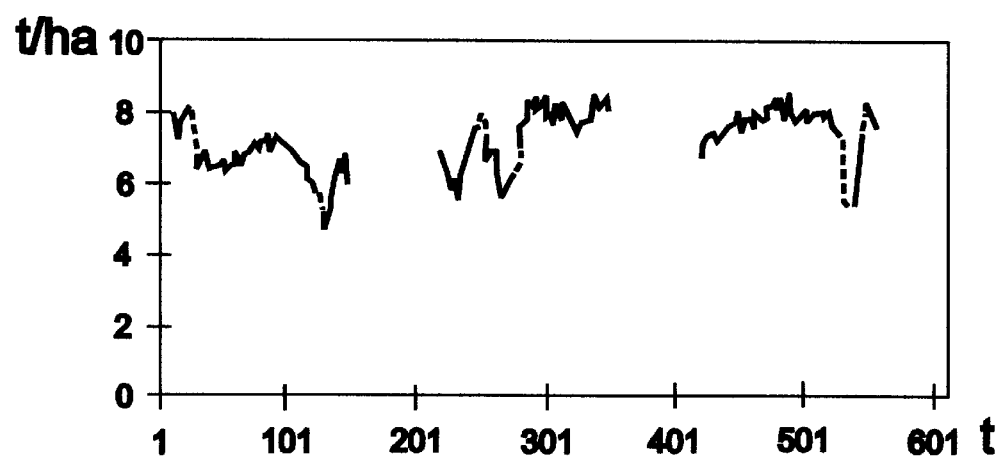
Fig. 9.H

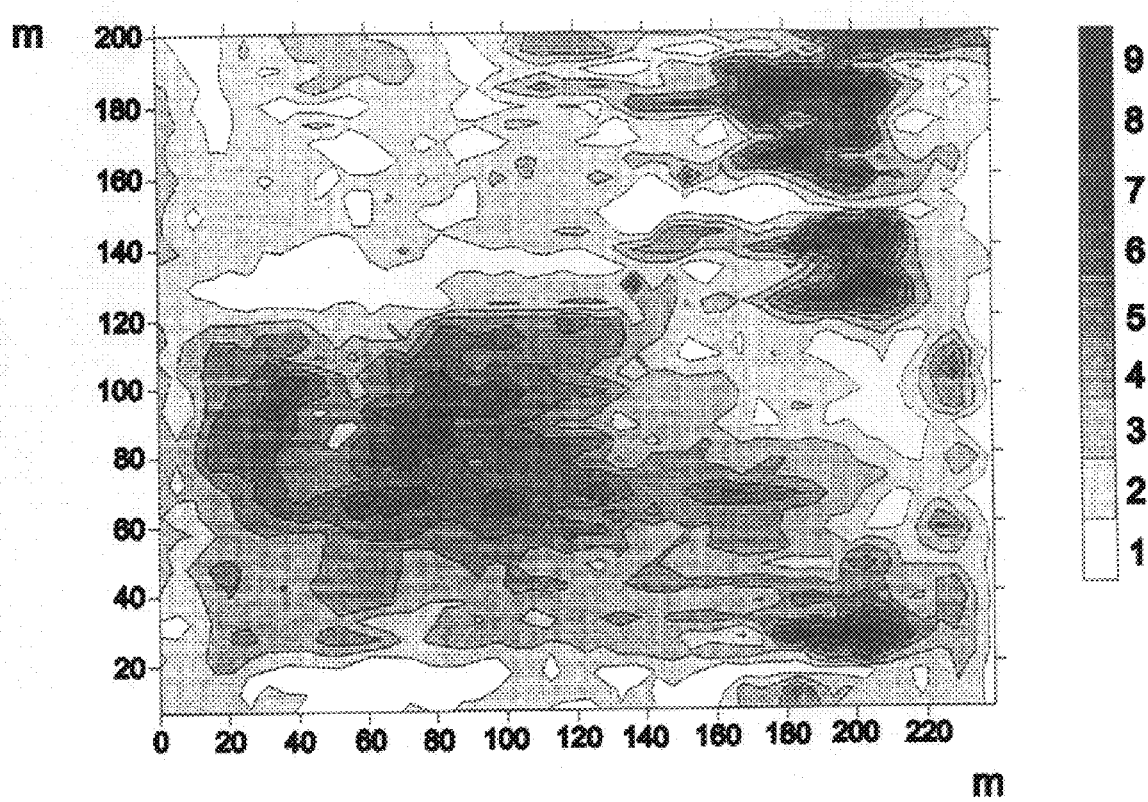
Fig. 11.A

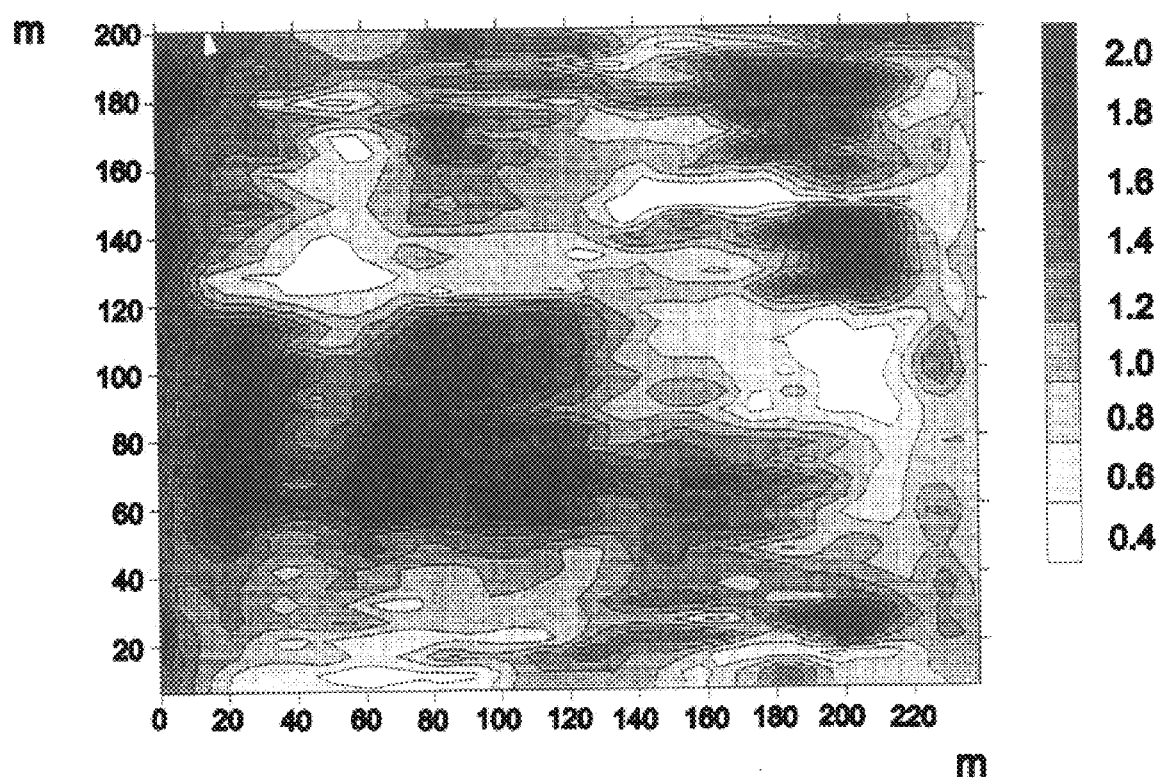
Fig. 11.B

METHOD OF MEASURING CROP HUMIDITY IN A HARVESTER

BACKGROUND OF THE INVENTION

The present invention relates to methods for measuring the humidity or moisture content of crop in an agricultural harvester and, more particularly, to the combination of data from a humidity sensor with data from a mass flow rate sensor.

It is already well known in the art to use data collected during harvester operations for the generation of maps showing the specific yield for each section of a field. To this end, the harvesting machine is equipped with a device for establishing the precise position of the harvester in the yield, such as a Global Positioning System (GPS) receiver, a ground speed sensor, such as a Doppler radar velocity sensor and a crop flow rate sensor, such as a grain mass flow sensor. The data generated by the sensors are logged during harvesting operations and can be used for generating a yield map for a complete field.

Such yield maps provide data on the amount of crop generated by each field portion, but say little on the other qualities of the harvested crop. For instance it may be of interest to have data on the ripeness of the crop. Such data may be derived from humidity or moisture sensors. These data can also assist in deciding whether to continue or interrupt the harvest when the evening is closing in. When the moisture content of the incoming crop material is too high, the efficiency of the threshing mechanism is falling rapidly.

However, such humidity sensors usually require a calibrated volume of crop material, such that dedicated sampling devices are needed for taking portions from the regular crop flow and feeding them into the humidity sensor. An example thereof can be found in U.S. Pat. No. 5,616,851.

It is also known to use a manually operated switch for marking deviating spots in a field during harvest operations. This information is loaded into the memory of the mapping system and is combined with the GPS information for indicating the spots on a map of the field. Such system has already been used for identifying weed spots. However, the reliability of such map is depends completely of the continuous attention of the operator and his quick reaction to the occurrence of such spots.

Accordingly, it would be desirable to provide a method for continuously assessing the humidity of harvested crop without the use of any sampling device.

SUMMARY OF THE INVENTION

It is, therefore, an object of the present invention to assess the humidity of incoming harvested crop on a continuous basis without the use of any sampling device.

According to the invention, there is provided a method for assessing the humidity of a crop during harvesting operations, including the steps of:
 harvesting a field using a harvesting machine having:
  a mechanism for collecting the crop from the field and feeding it into the harvesting machine;
  a crop processing means for processing the collected crop fed into said harvesting machine;
  a moisture sensor for monitoring the moisture content of the collected crop; and
  a mass flow rate sensor for monitoring the mass flow rate of crop material in said harvesting machine;
 logging data from said moisture sensor and said mass flow rate sensor while harvesting the field; and
 deriving the actual moisture content of the collected crop from the combined data from said moisture sensor and from said mass flow rate sensor.

The actual moisture content may be derived from a raw moisture content value, provided by the moisture sensor and consequent adjustment thereof in accordance with the mass flow rate value established by the mass flow sensor.

The moisture data can be logged during harvesting operations and combined with position data provided by a harvester location means for establishing a moisture content map of the field. Moisture content values exceeding a threshold value may be indicative of weed infected spots in the field.

A simple and robust moisture sensor may include one or more sensor plates mounted in a conveyor housing of the harvester. The sensor plate is electrically insulated and a voltage is applied thereto. The current from the plate through the crop material to the housing is representative of the conductivity and hence of the moisture content of the crop.

Such sensor may be combined with a sensor monitoring the mass flow rate of all collected crop material, e.g. a sensor measuring the power needed to drive a conveyor of the crop collecting means. Alternatively, the signal from a grain flow rate sensor may be used.

BRIEF DESCRIPTION OF THE DRAWINGS

The advantages of this invention will become apparent upon consideration of the following detailed disclosure of the invention, especially when taken in conjunction with the accompanying drawings wherein:

FIG. 9 is a set of graphs representing the treatment of the signal generated by a device monitoring the crop flow rate shown in FIG. 2;

FIG. 11 shows two crop conductivity maps derived from the signal of the moisture monitoring device of FIGS. 6 and 7.

DETAILED DESCRIPTION OF THE PREFERRED EMBODIMENT

For convenience, the illustrated agricultural harvesting machine is a combine harvester equipped with a grain header of conventional design, but it readily will be appreciated that the method according to the invention is equally applicable mapping systems using machines equipped with headers for harvesting other crops such as corn or sunflowers. It may also be used in other harvesting machines such as forage harvesters. Its use in combination with a combine harvester should thus not be appraised as limiting.

The terms "forward", "left", "right", "rear", etc. used in connection with the agricultural harvesting machine and/or components thereof are determined with reference to the direction of forward operative travel, but should equally not be considered as limiting. The terms "grain", "straw" and "tailings" are used principally throughout this specification for convenience, and it should be understood that these terms equally are not intended to be limiting. Thus "grain" refers to that part of the crop material which is threshed and separated from the discardable part of the crop material which is referred to as "straw". Incompletely threshed ears are referred to as "tailings".

Figure 1:
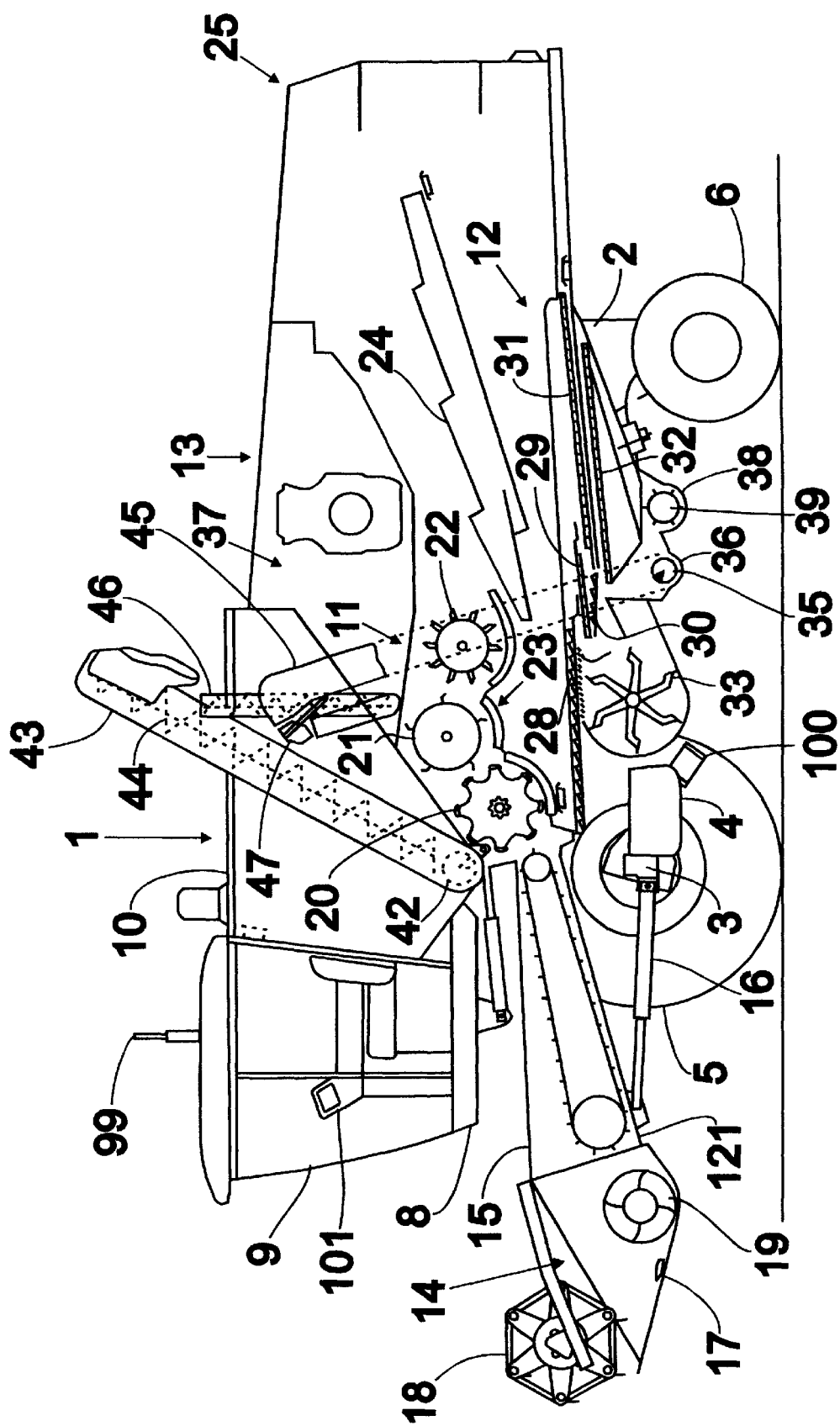
FIG. 1 is a schematic elevational view lengthwise of a combine harvester, equipped with a grain header, a straw elevator, crop processing means and a grain tank.

As illustrated in FIG. 1, a combine harvester, generally indicated at 1, comprises a main chassis or frame 2, supported on a fixed front axle 3 and a oscillating rear axle (not shown). The front axle 3 carries a traction gearbox 4, which is drivingly connected to a pair of drive wheels 5, supporting the front portion of the frame 2. The rear axle is supported by a pair of steerable wheels 6. Mounted onto the main frame 2 are an operator's platform 8 with an operator's cab 9, a grain tank 10, a threshing and separating mechanism 11, a grain cleaning mechanism 12, and a power plant or engine 13. The threshing and separating mechanism 11 and the cleaning mechanism 12 together constitute the crop processing means. A grain header 14 and a straw elevator 15 extend forwardly of the main frame 2 and are pivotally secured thereto for generally vertical movement, which is controlled by extensible hydraulic cylinders 16.

As the combine harvester 1 is propelled forwardly over a field with standing crop, the latter is severed from the stubble by a cutting arrangement in the form of sickle bar 17 at the front of the header 14 and guided to the center of the header by a reel 18 and an auger 19 to the mouth of the straw elevator 15, which supplies the cut crop to the threshing and separating mechanism 11. The crop received therein is threshed and separated, that is to say, the crop is rubbed and beaten, whereby the grain, seed or the like, is loosened and separated from the straw, coils or other discardable part of the crop.

The combine harvester 1, illustrated in FIG. 1, comprises a conventional threshing and separation mechanism 11 including a threshing cylinder 20, a straw beater 21 and a separator rotor 22, cooperating with a set of concaves 23. Conventional straw walkers 24 are operable, in use, to discharge a mat of remaining crop material (i.e. mainly straw as most grain is separated therefrom) through a straw hood 25.

Grain which has been separated by the threshing and separating mechanism 11 falls onto a first grain pan 28 of the cleaning mechanism 12, which further also comprises a pre-cleaning sieve 29, positioned above a second grain pan 30, an upper chaffer sieve 31 and a lower grain sieve 32, disposed the one above the other behind and below the pre-cleaning sieve 29, and a cleaning fan 33.

Clean grain falls to a clean grain auger 35 in a clean grain auger trough 36 and is subsequently conveyed by the auger 35 sideways to an elevator mechanism 37 for further transport to the grain tank 10. Incompletely threshed ears, the so-called "tailings", fall to a tailings auger in a tailings auger trough 38. The tailings are transported sideways by this auger to a separate rethresher 39 and returned to the first grain pan 28 for repeated cleaning action.

A grain tank auger 42 at the bottom of the grain tank 10 is used to urge the clean grain sideways to an unloading tube 43, wherein it is elevated by an unloading auger 44 for discharge from the harvester 1 into a container driven along the combine.

The elevator mechanism 37 comprises a lower, paddle type elevator 45 and an upper, so-called "bubble-up" auger 46. The paddle elevator 45 is fitted with a mass flow measuring device, indicated generally at 47 in FIG. 1. The device comprises a curved surface which is installed at the outlet opening of the elevator 45 and along which the grain flow is guided. The forces on said surface, which are proportional to the mass flow rate of the grain, are measured by an appropriate transducer. The surface preferably is circular in cross section and the measuring device 47 comprises a transducer measuring a force component or a moment representative of the grain flow rate. Such device is described in further detail in EP-A-0.753.720, incorporated herein by reference.

Figure 2:
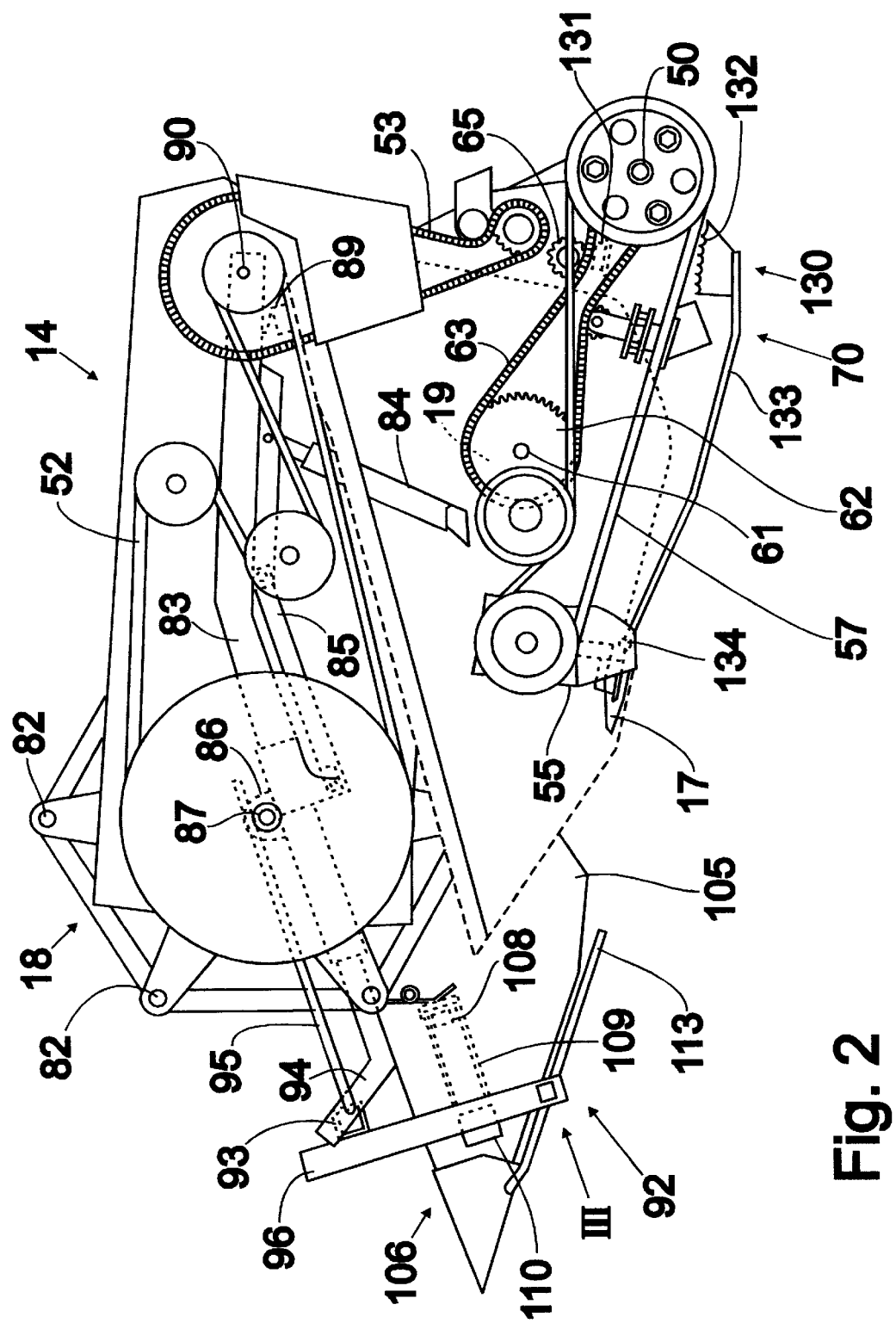
FIG. 2 is a schematic elevational view of the side of the header of FIG. 1, showing devices for monitoring the crop flow rate, the header height, the cutting width and the crop density.

As shown in FIG. 2, the header 14 has a primary shaft 50 for driving the other components of the header 14. The shaft 50 itself may be driven by the engine 13 via a drive line along the straw elevator 15 or by a hydraulic motor installed on the straw elevator 15 or on the header itself. The header drive line provides motive power for the rotation of the reel 18 and the auger 19 and for the motion of the sickle bar 17. The primary drive shaft 50 rotates the reel 18 via a drive line comprising a pair of variator sheaves interconnected by a belt (not shown), a chain 53 and a belt 52. The sickle bar 17 is oscillated by a gear box 55, which transforms the continuous rotation of its input shaft into the oscillatory movement of its output shaft. The primary header drive shaft 50 drives the gearbox 55 via a belt transmission 57. The header auger 19 has a shaft 61 carrying a sprocket wheel 62 for rotation thereof. An auger chain 63 is mounted over the sprocket wheel and a drive sprocket (not shown) mounted onto the primary drive shaft 50. The auger chain 63 is tensioned by an idler sprocket 65.

Figure 5:
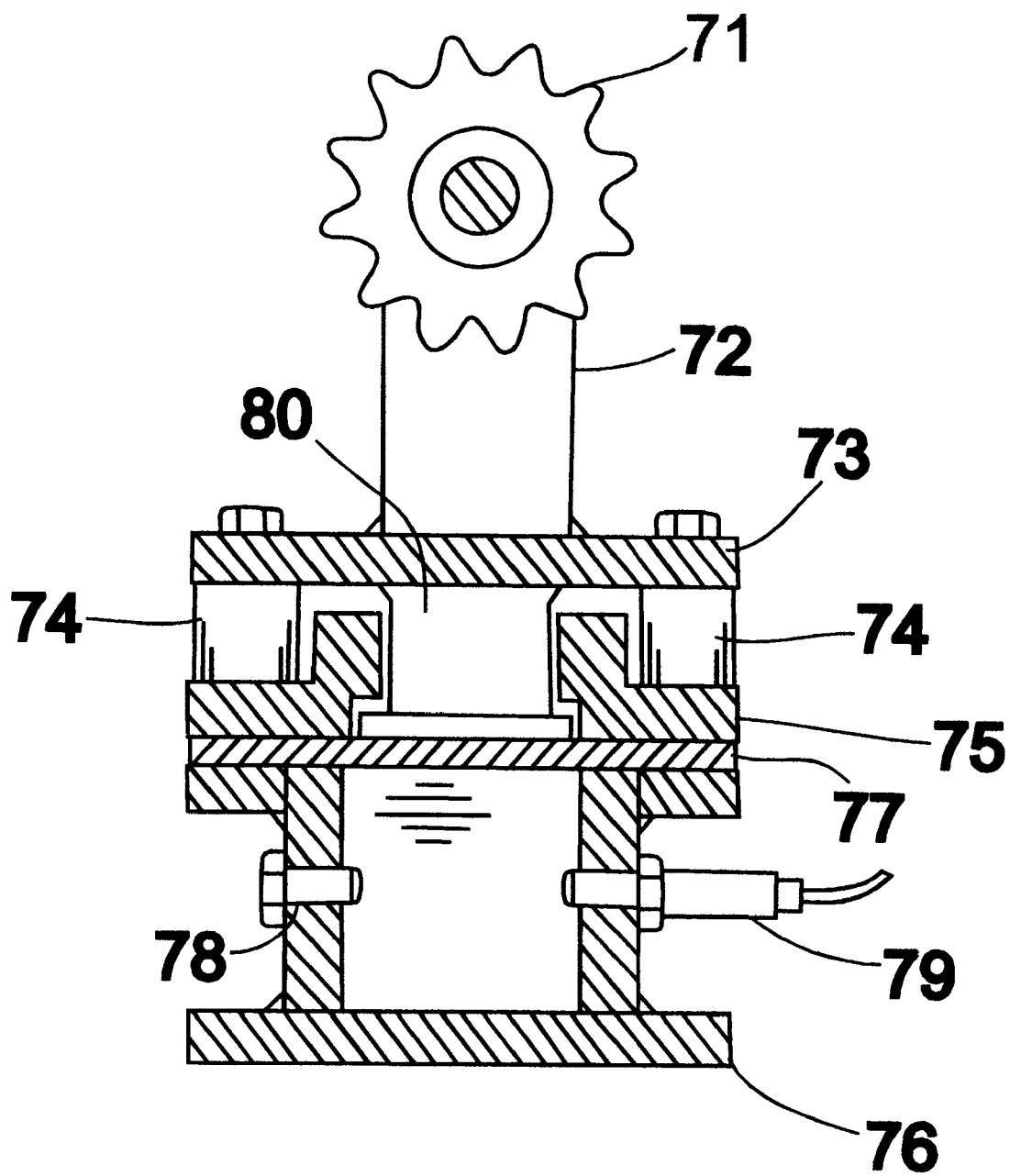
FIG. 5 is an enlarged, cross sectional view of the device for monitoring the crop flow rate of FIG. 2.

The forces on the lower stretch of the chain 63 are sensed by a further mass flow measuring device 70. As shown in FIG. 5, it comprises a sensor sprocket 71, which engages the portion of the chain 63 which transmits the force from the drive sprocket 64 to the sprocket wheel 62 of the auger 19. The sensor sprocket 71 is journaled between a pair of struts 72 (only one shown) welded to a square support plate 73. At its four corners, the support plate is bolted onto rubber mounts 74, which permit a slight vertical movement of the struts 72 and the sprocket 71. The mounts 74 are screwed into a top plate 75 covering a closed vessel 76. An oil-resistant rubber sheet 77 extends over the full top surface of the vessel and is held in place by the top plate 75. This plate has an aperture giving access to the surface of the rubber sheet 77. The vessel 76 has a fill hole 78 for filling the cavity of the vessel with oil and a pressure transducer 79 for sensing the hydraulic pressure inside the vessel. The pressure transducer may be of the type PR 23 REL as provided by Greisinger. The rubber sheet 77 is contacted by a plunger 80 which extends downwardly from the support plate 72 through the aperture in the top plate 75.

When a larger quantity of crop material is gathered by the header 14, the header auger 19 will require a larger amount of power. As the auger RPM does not vary significantly during normal harvesting operations, the auger torque is proportional to the consumed power and hence to the rate of the crop material conveyed by this auger. The torque increase tensions the driving portion of the chain 63 and effects a downward force on the sensor sprocket 71. The rubber mounts 74 enable a slight downward movement of the support plate 73 and the plunger 80. The action of the plunger base on the rubber sheet 77 raises the oil pressure in the vessel 76. Consequently the evolution of the oil pressure reflects the evolution of the torque on the header auger 19 and hence of the flow rate of harvested crop material. It has been experienced that the sensor arrangement 70 senses the mass flow rate of all crop material conveyed into the combine harvester 1: the transducer signal is proportional to the mass flow of straw plus the mass flow of grain.

As illustrated in FIG. 2 the header reel 18, which comprises six transverse tine bars 82, has a reel shaft 87 mounted for rotation between two pivotable arms 83 which are attached to the sides of the header frame. The position of the reel 18 requires adjustment to accommodate to various crop conditions. To this end a first pair of single-acting hydraulic cylinders 84 lifts or lowers the reel arms 83 and a second pair of double-acting hydraulic cylinders 85 moves the bearings 86 of the reel rotation shaft 87 forwards or backwards along said arms 83. The cylinders 84, 85 are controlled by the operator from the cab 9 to make the reel tines engage the standing crop at a fixed distance below the top in order to bend over the crop stems and to guide the latter at an optimal angle to the sickle bar 17. Hence the position of the reel 18 and the reel arms 83 is indicative of the actual height of the crop on the field.

In its lowermost position the left arm 83 engages a switch 89 which is positioned on the header frame near the pivot 90 of the header arm 83. This switch 89 constitutes a crop level sensor, which is actuated when the top of the crop is at a very low height and the reel 18 is lowered to engage the stems below the ears. This may occur when the grain stems are excessively long and the weight of the ears made them bend over onto the ground, or when wind or rain flattened all or part of the crop. Conventionally these conditions are referred to as "lodged crop". They require a lowermost setting of the reel 18 for the tines to rake up the lodged crop and to guide it to the sickle bar 17. Usually most of the grain ears can still be recovered, but a significant portion of the stems may still escape from the cutting action and remain rooted into the ground.

Figure 3:
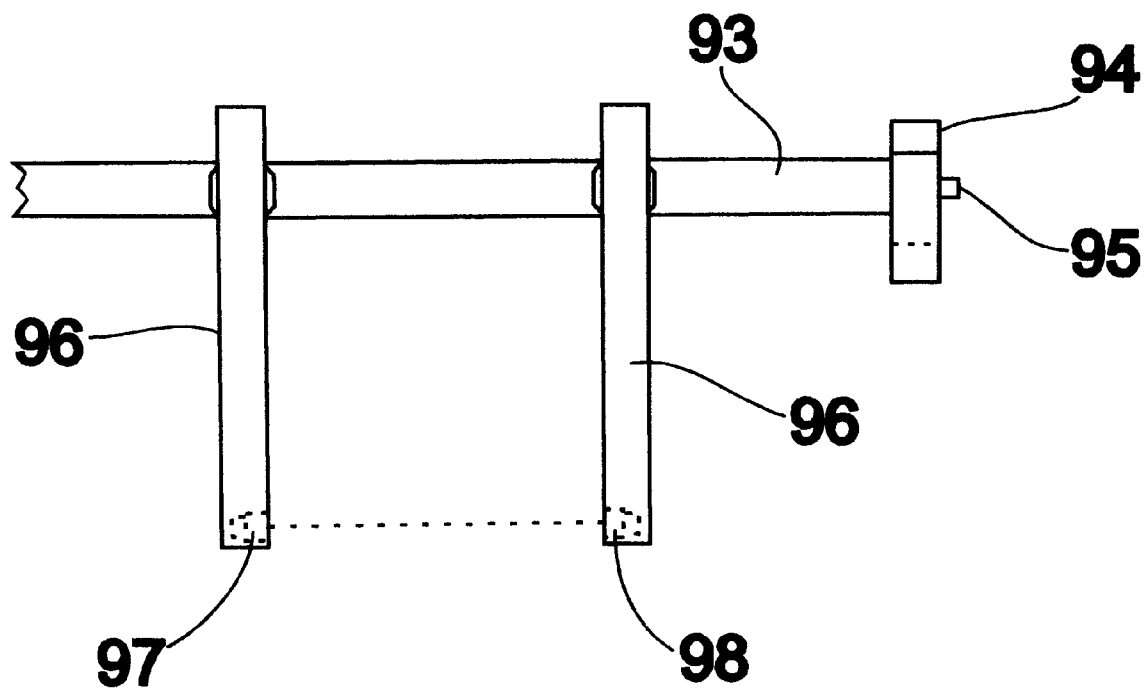
FIG. 3 is a front view of device for monitoring the crop density taken in the direction of arrow III in FIG. 2.

Attached to the front portion of the reel arms 83 and moved in unison therewith is a grain density measuring device 92, which comprises a transverse beam 93, extending over the full width of the header 14. The beam 93 has at its outer ends a pair of rearwardly extending, cranked support arms 94, which are mounted for telescopic sliding movement into the front ends of the reel arms 83. The transverse beam 93 is held at a fixed distance from the reel 18 by a pair of rods 95, having the one end connected to the support arms 94 and the other end to the reel bearing 86. Consequently, the beam 93 is moved up and down in unison with the reel arms 83 and is moved forwards and backwards with the reel shaft 18. The grain density measuring device 92 comprises at least one and preferably three sets of transmitter-receiver units. As illustrated in FIG. 3, each set is constituted by a pair of downwardly extending profiles 96, welded onto the transverse beam 93 and having at their lower ends an optical transmitter 97 and an optical receiver 98, directed to the transmitter for sensing the light beam emitted by the transmitter 97. The measuring device 92 may use infrared light. The small width of the profiles 96 prevents important disturbance of the measured signal caused by grain stems which are pushed over by the lower ends of the profiles 96 and then sweep back in front through the measuring area between the transmitter 97 and the receiver 98.

Normally, each stem of grain passing between the profiles 96 interrupts the light beam and is detected by the receiver 98. The interruptions in the receiver signal are indicative of the crop density, i.e. of the number of crop stems per square meter. The harvester 1 is equipped with a speed sensor 100 (FIG. 1) which measures the actual ground speed of the vehicle on the field. This speed sensor 100 may be a Doppler radar velocity sensor. For establishing the grain density, the light beam interruptions per second are counted and divided by the ground speed and the width between the transmitter 97 and the receiver 98. The result in counts/m$^2$ represents the crop density. In grain good results were obtained with a distance of 0.15 m between the profiles 96 and a penetration level of 30 cm below the top of the crop.

The signal of one set may be not be representative of the crop condition over the full width of the header 14, for instance in cases where the set is positioned over the old trail of an agricultural vehicle used during fertilizing and spraying operations. To avoid such false readings, the density measuring device 92 can comprise three sets of transmitters and receivers: one set in the middle of the header and two others near the sides thereof. The signals from the three receivers 98 are then combined to establish the actual mean grain density over the full header 14. The distance between the measuring sets is chosen to be clearly distinguished from the distance between the trails of the left and right wheel of the agricultural vehicle, to avoid the accumulation of errors from two sets during density measurement.

Figure 4:
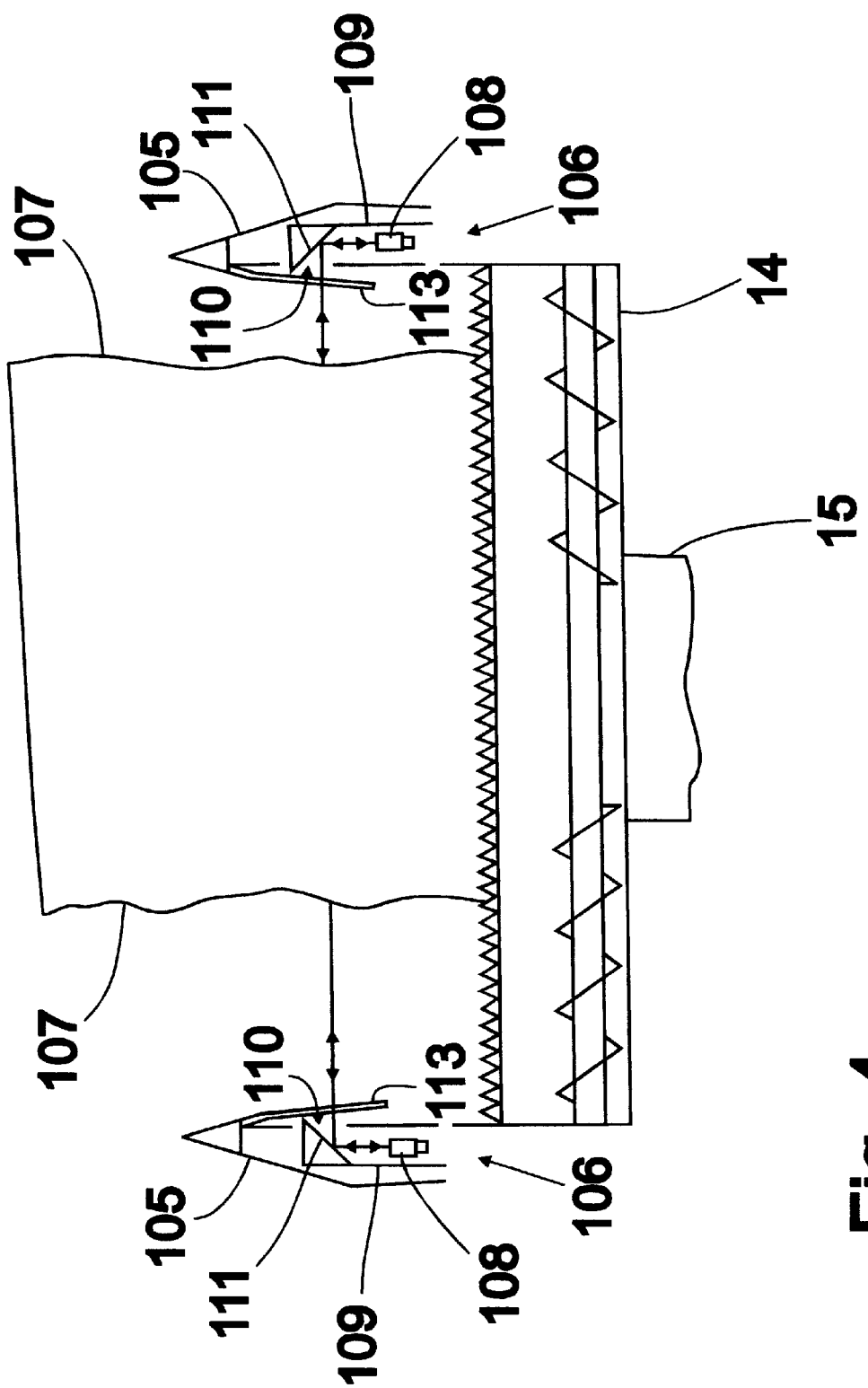
FIG. 4 is schematic top view of the header of FIG. 2 during harvesting operations, illustrating the operation of the device for monitoring the cutting width.

The header 14 of FIG. 2 further is equipped with a crop divider 105 on each side of the header frame. The dividers 105 are driven into the grain for splitting the crop sideways in front of the header before it is cut by the sickle bar 17. A crop width measuring device 106 is installed inside each divider 105 for monitoring the distance from the edge 107 (FIG. 4) of the uncut crop to the side of the header and establishing thereby the actual width of the strip being harvested. Each measuring device 106 comprises an ultrasonic distance sensor 108 of the type emitting an ultrasonic sound burst and measuring the travel time for the reflected signal to be received by the same sensor. The distance to the reflecting surface is then derived from the measured travel time. In this embodiment the sensor 108 is mounted at the one end of a channel 109 having a square cross section and being mounted to the inside of the divider 105. The channel 109 is inclined with respect to the horizontal, with the sensor 108 at the upper side, such that any stray material getting into the channel 109 is discharged by gravity through the aperture 110 at the lower end thereof. A deflector plate 111 is installed at an angle of 45° before the aperture 110, for redirecting outgoing and incoming sound waves under angle of 90°. This channel arrangement provides additional path length between the sensor 108 and the possibly closest location of the crop edge 107, sufficient to exceed the minimum path length for good measurement by this ultrasonic sensor 108. The alignment of the channel 109 with the longitudinal direction of the divider 105 minimizes the space requirements for the measurement device 106 and avoids unwanted interference with any part of the crop.

To prevent intrusion of crop material and the blocking of the aperture 110, a crop guide bar 113 is welded to the tip of the divider 105. The bar 113 extends rearwardly from the divider tip and is about 5 cm offset from the lower edge of the divider 105. It prevents that the grain stems slide along the lower portion of the divider surface and deposit material in and around the aperture 110.

The cutting height of the header 14 is established by a cutting height measuring device 130 installed at the rear of the header frame (FIG. 2). It is of the type described in EPA-0,765,594, incorporated herein by reference, and comprises an ultrasonic distance sensor 131, which may be of the same type as the sensors 108 used in the crop width measuring device 106. The sensor 131 is directed downwardly to a corrugated reflector surface 132 attached to the rear of movable header shoe 133, which is connected by a pivot 134 to the header bottom adjacent the sickle bar 17. During normal harvesting operations, the header shoe 133 rests on the ground and follows any variation of the ground profile. The rear end carrying the reflection surface 132 is raised and lowered accordingly. The actual distance of the sickle bar 17 to the ground is derived from the signal of the distance sensor 131 and can be used for determining the actual length of the crop stems remaining on the field.

Figure 6:
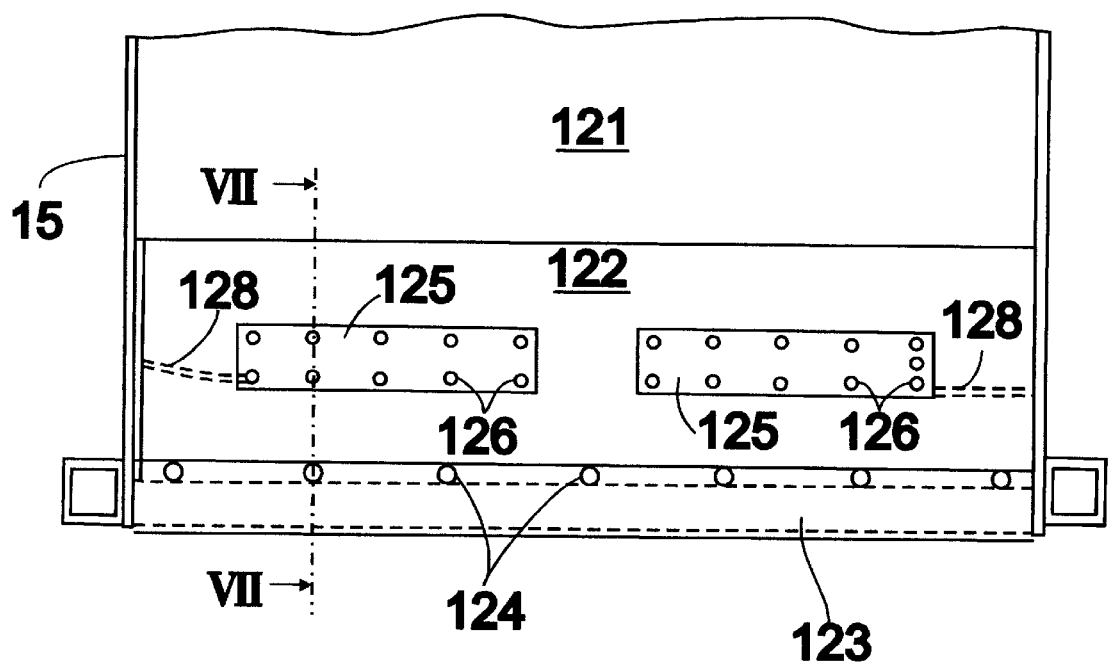
FIG. 6 is a top view of the bottom of the straw elevator taken in the direction of arrow VI in FIG. 1 and showing a device for monitoring the moisture content of the harvested crop.
Figure 7:
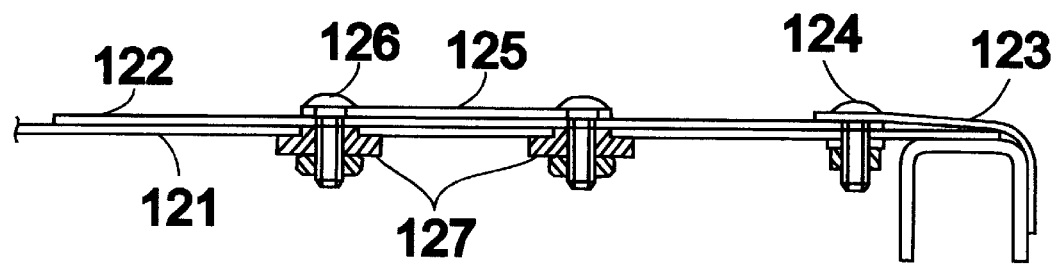
FIG. 7 is a cross sectional view of the straw elevator bottom, taken along line VII—VII in FIG. 6.

As illustrated by FIGS. 6 and 7, the straw elevator 15 is provided with a crop moisture measuring device 120, based on the electrical conductivity of the incoming crop. The straw elevator bottom 121 adjacent the mouth of the straw elevator 15 is covered with an electrically insulating plate 122, which may be made out of an polyamide plate. At the entrance of the straw elevator the front edge of the insulating plate 122 is covered by an angled wear plate 123. A plurality of bolts 124 affix both plates to the bottom 121 of the straw elevator 15. A pair of sensor plates 125 are mounted on top of the insulating plate by square neck bolts 126. These bolts extend through the sensor plate 125, the insulating plate 122 and the elevator bottom 121. To prevent electrical contact with the elevator bottom 121, each bolt is provided with an insulating bushing 127 having a shoulder which fits in the holes in the bottom 121 and contacts the insulating plate 122. A positive voltage is applied to the sensor plates 125 via wires 128 connected to a bolt 126 at the corner of the plates. When crop material is entering the straw elevator 15, its moisture will enable the flow of current from the sensor plates 125, via the crop to the frame 2 of the harvester 1. This current is monitored to establish the moisture content of the crop material.

The combine harvester 1 is equipped with a positioning means for establishing the actual position of the harvester on a field during harvesting operations. The positioning means may comprises a position sensor 99 such as the receiver of a Global Positioning System (GPS). Alternatively, position data may be derived from radio beacons.

The data which are generated by the position sensor 99, the speed sensor 100 and the various measuring devices 47, 70, 89, 92, 106, 120 and 130 of the harvester 1 are transmitted to an on-board computer 101, which is installed in the cab 9. During harvesting operations, the data generated by the sensors and devices are logged for establishing a map representative of a variable derived from one or more parameters, based on these data, at several locations of the field.

For example it is possible to establish grain yield maps, showing the specific grain yield/ha for each location in the field, based on the logged data of the position sensor 99 (GPS receiver), the speed sensor 100, the mass flow measuring device 47 and the crop width measuring device 106. As the mass flow of the grain is measured after a time interval of about 15 seconds after the severing by the sickle bar 17, a similar time shift has to be applied to the mass flow rate data for assigning the right data to the right location in the field as established by the position sensor 99. The specific yield ($kg/m^2$) is then derived from the measured yield rate (kg/s) divided by the ground speed (m/s) and the working width (m).

Such map will only show the grain quantities which were actually harvested. However, under adverse conditions, such as when part of the crop is lodged, not all ears will be cut and collected by the header 14. The actually available crop in the field then is higher than the crop figures indicated by the map. This may lead to ineffective crop management decisions for future crops. For example, a surplus of nutrients and sufficient water in the first growing stage of the grain may produce excessively long grain stems, which will bend over and get lodged at the first adverse weather conditions. At the time of harvest not all ears might be recuperated by the header 14 and a consequent drop in grain yield may be seen. Without further information, one might derive from such map that, on this very spot, the field needs more nutrients for improving the yield during the next season. However, from the above it is clear that an excess, rather than a shortage of nutrients might be the cause of the poor yield at these locations.

Figure 8:
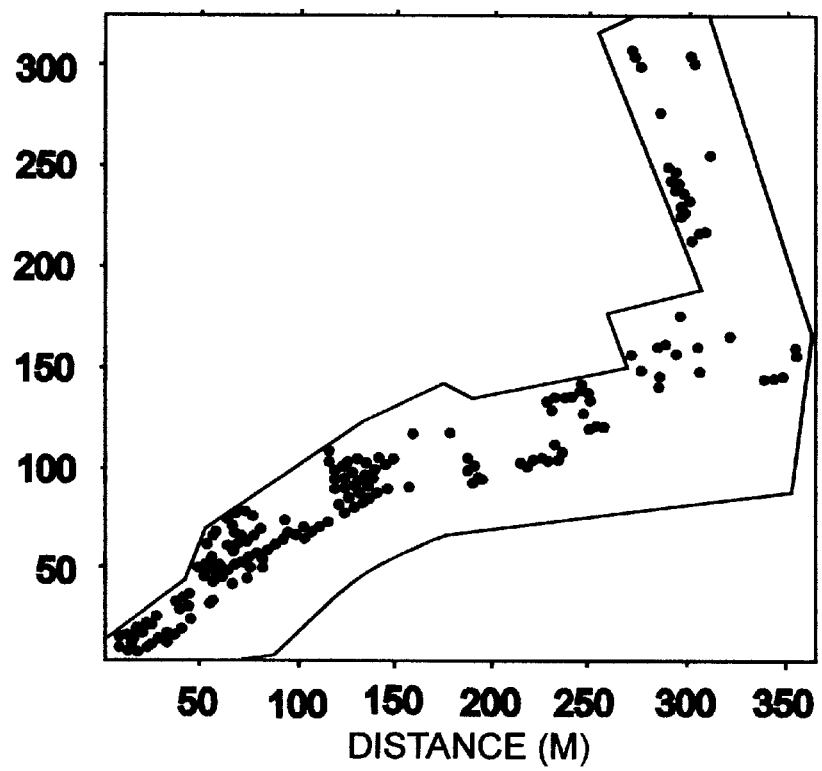
FIG. 8 is a map of a field showing the location of lodged crop plots.

Therefore, it is of interest to log the data of the crop level detector switch 89 and to use them for correcting the yield maps. Automatically logged crop level data from this switch 89 can be combined with the GPS data for establishing a map of lodged crop locations for a field. Such map is exemplified in FIG. 8.

The grain yield data for the spots with lodged crop should be regarded as being not completely reliable. Accordingly an updated yield map can be generated by disregarding the grain yield data for such spots. The holes in the map are then filled in with data derived from the surrounding spots with normal, standing grain.

Even if little of the lodged grain ears is lost, it is still required to take account of the data provided by the switch 89 while calculating the specific grain yield. For example, the edge 107 of a spot of lodged crop will not be detected by the sensors 108 of the crop width measuring device 106, and accordingly, the established cutting width will be seriously underestimated. As a result the specific yield may be overestimated. These effects on the yield map may be prevented by disregarding the crop width data for the spots with lodged crop and using a standard width value instead. Advantageously, a value may be used corresponding to the mean value of the crop width shortly before the lodged crop area was entered. Such standard width value can be adapted automatically at regular intervals to the previous crop width data provided by the measuring device 106. It may be assumed that the operator will not suddenly deviate the combine and change the width of the crop strip he is harvesting in one go, only because a portion thereof is lodged. The prior width data therefore constitute a good estimate, which can be used for further calculation of the specific grain yield. Alternatively, the grain yield data may be disregarded completely for the lodged crop spots as described above.

The same rules may also be applied to the maps showing the specific total crop mass yield (kg/ha), which are derived from the signals of the further mass flow measuring device 70 on the auger 19 of the header 14, the position sensor 99, the speed sensor 100 and the crop width measuring device 106. Herein not only the missed ears but also the missed portion of the stems will negatively influence the yield measurements while harvesting the lodged crop. Based on the signal of the crop level detector switch 89, the measured crop yield data may be validated or disregarded. The signal is also used for validating or disregarding the data from the crop width measuring device 106 as described above with respect to the grain yield measurement.

The data from the grain density measuring device 92 can also be combined with the GPS data for establishing a grain density map for a field. It will be appreciated that the occurrence of lodged crop also badly influences the readings of the receivers 98. The light beams emitted by the transmitters 97 and sensed by the receivers 98, may then completely miss the lodged stems, such that a zero density would be indicated on the density map. These density data are unreliable, but may marked as such by taking account of the signal from the crop level detector switch 89. The data may then be disregarded during the further establishment of the density map. The data for the spots of lodged crop are then derived from the surrounding spots with standing grain.

Also other criteria may be used for validating or disregarding crop yield data or other parameters derived from the measuring devices on the harvester 1.

One important criterion is harvester speed: when the harvester is traveled at an excessively low speed, no substantial yield rates can be measured, as the measured values hardly exceed the noise of the empty running harvester. Accordingly the data generated by the mass flow measuring devices are disregarded for the spots where the speed sensor 100 measured a speed below a predetermined limit.

Also when excessive ground speeds are measured, the corresponding mass flow data are disregarded for specific yield calculation. Speeds above a predetermined value are not caused by the actual forward speed of the harvester 1, but follow from sudden, short accelerations, such as those occurring during direction changes.

Unreliable yield data are also generated when a very narrow strip of crop is being cut, e.g. while harvesting the last strip in the field. Also in this case the measured yield values will hardly exceed the noise of the empty running harvester. When the crop density is measured, only one of or no transmitter-receiver set sees crop passing in between, such that a very irregular signal is generated. Therefore it is advantageous to disregard yield and density data when the width of the harvested crop as established by the crop width measuring device falls below a predetermined value.

A further criterion involves the evolution of the yield signal itself. The signal from the mass flow measuring device 47 on the grain elevator 45 follows from a grain flow established after the complete crop processing stage in the combine harvester 1. Accordingly any sudden changes in yield at the sickle bar 17 will be smoothened out by the time the corresponding new grain flow reaches the curved surface of the measuring device 47. If sudden changes nevertheless are measured, these rather follow from crop independent factors, such are inadvertent acceleration or deceleration of the harvester 1 itself or of one of the components of its crop processing means 11, 12. Hence, the jumps in the established grain yield signal are usually not related to actual changes in the field and have to be disregarded while establishing the yield map.

FIG. 9 illustrates the various steps used for processing a signal produced by the yield measuring device 47. FIG. 9.A represents the raw signal produced by the transducer. FIG. 9.B is the same signal after removal of the baseline value and the time shift (15 s) in order to obtain values which are proportional to the actual mass flow and which can be related to the positions established by the position sensor 99. In FIG. 9.C the yield data are averaged over 5 to 15 measurement samples to remove the effect of erroneous peak values. Next the signals relating to non-harvesting conditions are cut out (FIG. 9.D). These are the low values occurring when the crop flow is interrupted, e.g. because the combine harvester 1 is stopped or the harvester header 14 reaches the bare headland. A calibration factor is applied to this net signal for the generation of physical yield rate values (ton/h) (FIG. 9.E). Then these data are combined with the data from the speed sensor 100 and the crop width measuring device 106 for calculating the specific yield (ton/ha) for each spot in the field (FIG. 9.F). From this specific yield signal the second derivative is established for identifying the points where the changes cannot be related to actual crop changes in the field. When the absolute value of the second derivative exceeds a predetermined limit, the corresponding yield data are disregarded (FIG. 9.H) for establishing the yield map.

Also when the position of the harvester 1 cannot be determined with sufficient precision, e.g. because the GPS signal is interrupted by surrounding walls or trees, the concurrent yield data cannot be used for establishing the yield map and these data have to be cut out from the yield signal.

In this manner it is possible to "tidy up" the raw sensor data before they are used for establishing a map representative of variable (e.g. specific yield (T/ha)) derived from parameters (e.g. yield rate (T/h)) based on these sensor data.

Figure 10:
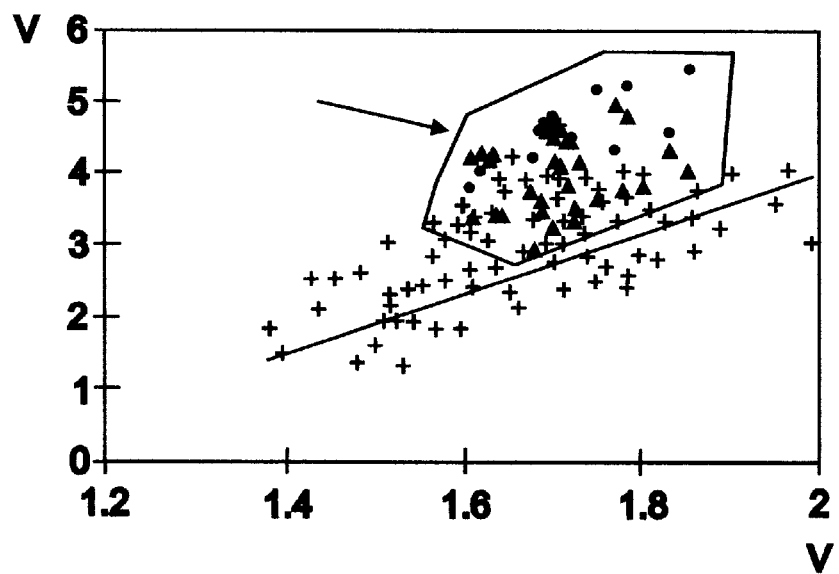
FIG. 10 is a graph illustrating the correlation between a yield rate signal and the humidity signal generated by the moisture monitoring device of FIGS. 6 and 7.

The signal from the moisture measuring device 120 depends on the conductivity of the layer of incoming crop. The current flowing from the sensor plates 125 to ground is largely determined by the humidity of the stems, which constitute the larger portion of the crop layer in the straw elevator 15. However, the volume of the crop bridging the sensor plates 125 and the body of the straw elevator 15 does equally influence the readings of the measuring device 120. Smaller volumes will reduce the total conductivity of the layer and hence the measured current values. The volume of the layer increases when the crop is introduced at a large rate, e.g. because the harvester 1 is driven at a greater speed. This total mass flow rate (straw plus grain) is measured by the mass flow measuring device 70 on the transmission of the header auger 19. FIG. 10 illustrates the correlation between the yield rate signal provided by the pressure transducer 79 and the humidity signal provided by the moisture measurement device 120. Crosses indicate measurements for normal crop, while the circles and triangles are measurements for spots where a significant amount of weed was encountered. It is clear from this chart of FIG. 10 that actual crop moisture cannot be derived from the moisture signal alone. The signal has to be adjusted for the actual mass flow rate, to obtain a value which is solely dependent upon the moisture content of the incoming crop. The factor by which the humidity signal has to be divided, increases with increasing mass flow rate. More particularly, the graph of FIG. 10 depicts crosses that show test values, i.e., straw auger torque/yield rate and conductivity sensor signal/humidity, in a field having a mean moisture content $MC_{ref}$. For this mean moisture content, the relationship between the yield sensor signal $V_{YR}$ and the conductivity sensor signal $V_{MC}$ is illustrated by the straight line passing through points (1.4, 1.5) and (4.0, 2.0) in FIG. 10. Accordingly, one of ordinary skill in the art can predict for each yield rate value $V_{YR}$, the output $V_{MC}$ of the conductivity sensor, provided that the moisture content remains equal to $MC_{ref}$. The value may be derived by this graph shown in FIG. 10 or by using the formula for the straight line in this graph.

When one of ordinary skill in the art has collected field data using the yield rate sensor and the conductivity sensor, he can derive the actual moisture content $M_{ci}$ from a measured set of data $V_{YRi}$, $V_{MCi}$ (which would correspond to the raw moisture content) by using the graph, or formula thereof, to determine the standard output $V_{MCs}$ corresponding to the measured $V_{YRi}$. Accordingly, the actual moisture content $M_{Ci}$ can be calculated by the formula:

$M_{Ci}=M_{Cref}*V_{Mci}/V_{MCs}$, wherein the factor $V_{MCs}$ is the factor which increases with increasing mass flow rate value.

FIG. 11.A shows a moisture map derived from the raw data of the moisture sensor. FIG. 11.B shows the map based on the same data with a correction for the actual crop flow rate. On the left hand side of the map, the higher moisture content near the border of the field is substantially more pronounced.

The higher moisture content of the weed is reflected in the higher moisture readings for equal mass flow rates as indicated by the circles and triangles in FIG. 10. There is a perceivable deviation from the normal mass flow-conductivity relation indicated by the full line in the graph. This finding can be used for automatically generating weed infestation maps, based on the combined signals from the crop moisture measuring device 120 and the mass flow measuring device 70. For this purpose the moisture signal is monitored and compared with the standard moisture which may be expected for the measured mass flow rate. In case the actual signal exceeds by a predetermined amount the standard value, it may be concluded that an amount of green weed has been collected by the header 14. These spots may be logged and indicated in a field map for later refined analysis of the yield results and the taking of future agricultural management decisions. For instance such maps enable assessment of the efficiency of the used weedkiller application.

The signal generated by the auger mass flow metering device 70 is proportional to the total mass flow rate of straw plus grain and is not influenced by changing grain to straw ratios. Such change occurs when the header 14 is lifted or lowered and a shorter or longer portion of the grain stems is cut by the sickle bar 17 and collected by the harvester 1. When crop is harvested using several cutting heights, the signal of the mass flow sensor alone will not be representative of the real evolution of the total crop mass on the field.

The actual mass flow rate of the straw collected by the harvester 1, may be established by subtracting from the total mass flow values provided by the auger metering device 70, the grain yield values provided by the elevator mass flow metering device 47.

For establishing the yield of the straw which was standing on the field, it is necessary to take account of the cutting height of the header 14. This value can be derived from the signal of the height measuring device 130. For a higher header more straw will remain in the stubble on the field and the cut straw value derived from the devices 47 and 70 has to be multiplied by a larger correction factor to arrive at the actual yield of the straw grown on the field.

Figure 12:
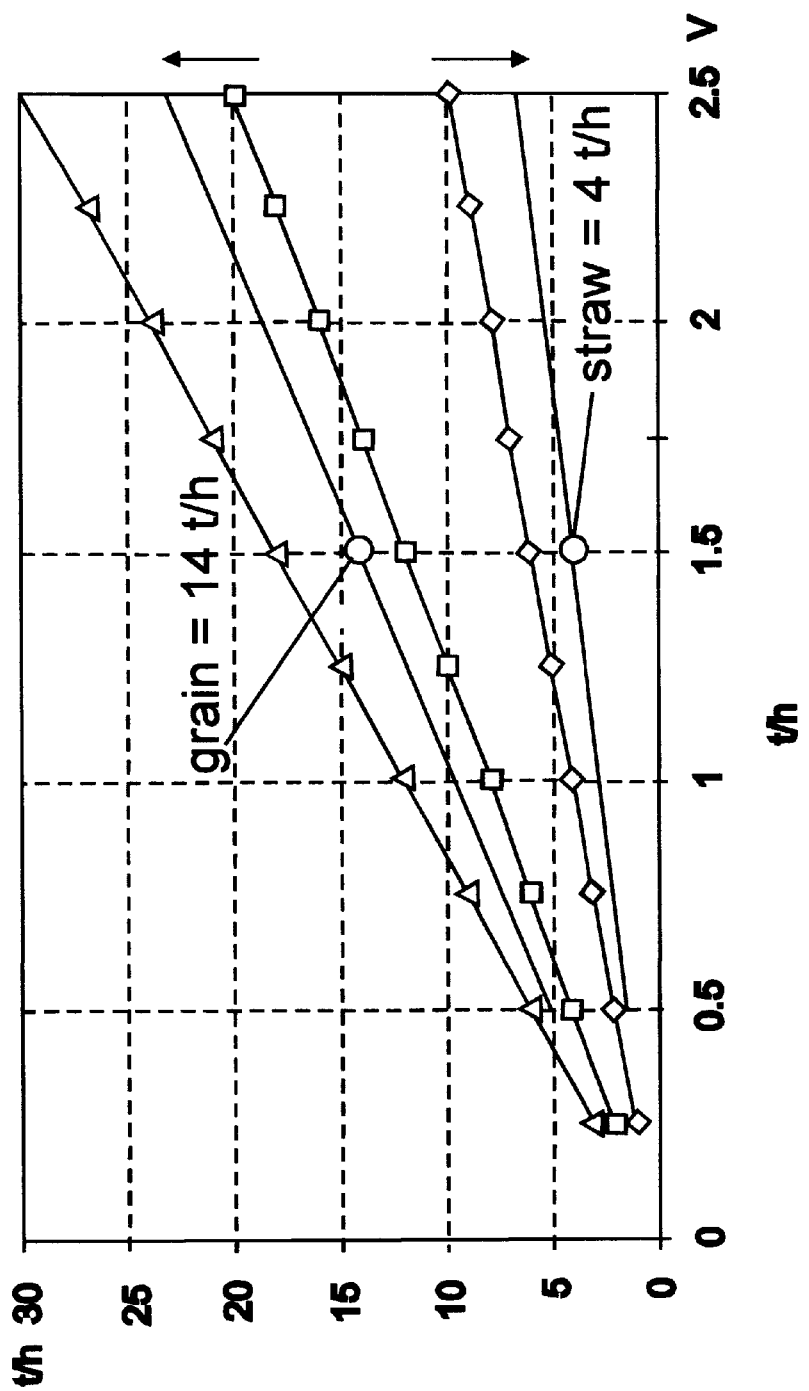
FIG. 12 is a representation of the relation between a signal from the crop flow monitoring device of FIG. 5 and the crop flow rates grain and straw.

It is also conceivable to derive the mass of the cut straw directly from the signal of the auger metering device 70. The lines in FIG. 12 illustrate the relation between the auger torque signal on the one hand (X-axis) and the mass flow rates of the straw (indicated by diamonds), the grain (squares) and the total crop (triangles) on the other hand. The line for the total crop flow rate is not dependent upon the grain to straw ratio. The lines for straw and grain are drawn for a fixed grain to straw ratio, which is acceptable in a lot of fields, as long as the cutting height is kept at a constant level.

When the header 14 is raised or lowered, the line for the total crop will still remain valid, but there will be a shift of the grain and straw lines. This shift may be derived directly from the evolution of the crop flow data, without renewed calibration of the sensor. Indeed, it may be assumed that no level change will be applied that makes the sickle bar 17 miss the ears of the grain. Consequently the grain flow rate will not be affected. The consequent change in header auger signal is to be attributed exclusively to the change of the straw flow rate.

It has already been indicated that the relationship auger torque signal to total crop flow rate remains unaffected by changes in grain to straw ratio. Hence the upper calibration line remains in force after the height change. The grain flow value known from the last measurement at the previous header height is used to establish the new relationship of auger torque signal to grain flow rate. Finally the straw flow value, obtained by subtracting the old grain flow value from the total crop flow value, is used for establishing the new auger torque to straw flow relation.

For example, an auger torque signal of 1.75 V corresponds to a mass flow rate value (A) of 21 T/h. The grain flow rate (B) is 14 T/h and the straw flow rate (C) is 7 T/h. After raising the header 14, the auger torque signal falls to 1.50 V, corresponding to a mass flow rate value (D) of 18 T/h. The grain flow rate (E) remained at a level of 14 T/h and the straw flow rate (F) falls to 18−14=4 T/h. The coordinates (1.5, 14) and (1.5, 4)—points E and F—constitute the reference points for the new auger torque signal-mass flow rate relations for the grain and the straw respectively, indicated in bold lines in FIG. 12. Hence, it is not required to establish new calibration curves from scratch. It suffices to monitor the signal from the height measuring device 130 and to register the actual change in total crop signal (from A to D) at the moment of the actual change for deriving therefrom the new auger torque signal to mass flow rate relations.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A method for assessing the humidity of a crop during harvesting operations, comprising the steps of:
   harvesting a field using a harvesting machine which includes:
      a mechanism for collecting crop from the field and feeding it into said harvesting machine;
      a mechanism for processing said crop fed into said harvesting machine;
      a moisture sensor for monitoring the moisture content of the collected crop and generating a signal; and
      a mass flow rate sensor for monitoring the mass flow rate of crop material in said harvesting machine and generating a signal;
   logging data from said moisture sensor and said mass flow rate sensor while harvesting the field; and
   deriving the actual moisture content of the collected crop from the combined data from said moisture sensor and from said mass flow rate sensor by the substeps of:
      monitoring the signal from the moisture sensor and deriving therefrom a raw moisture content value;
      monitoring the signal from the mass flow rate sensor and deriving therefrom a mass flow rate value; and
      adjusting the raw moisture content value inversely proportionally to the mass flow rate value to obtain the actual moisture content value by dividing the raw moisture content value by a factor.

2. The method of claim 1 wherein said factor is linearly proportional to the mass flow rate value.

3. The method of claim 2 wherein said harvesting machine further includes a location device for locating the position of said harvesting machine in the field, said method further comprising the steps of:
  logging data from said location device while harvesting said field; and
  establishing a map representative of the derived moisture content at several locations in said field based on said logged data.

4. The method of claim 3 wherein said map establishing step comprises the step of:
  establishing a map showing locations where said derived moisture content exceeds a threshold level, thereby indicating of the presence of weed in the field.

5. The method of claim 4 wherein said moisture sensor monitors the conductivity of the crop fed into the harvesting machine.

6. The method of claim 5 wherein said moisture sensor includes at least one sensor plate mounted onto an insulating plate inside a conveyor housing of the harvesting machine and a means for measuring the electrical current flowing from said sensor plate, via the collected crop, to the conveyor housing.

7. The method of claim 6 wherein said mass flow rate sensor monitors the flow rate of the total crop collected by said crop collecting means.

8. The method of claim 6 wherein said mass flow rate sensor measures the amount of power used to drive a conveyor which transports the collected crop.

9. The method of claim 6 wherein said mass flow rate sensor monitors the flow rate of a portion of the crop collected by said crop collecting mechanism.

10. The method of claim 6 wherein said mass flow rate sensor measures the flow rate of grain harvested and processed from crop by said crop processing mechanism.

11. A method of detecting weed infestation of crops being harvested by a harvesting machine having a crop harvesting header for collecting crops from a field and feeding the collected crops into a crop processing mechanism that processes the collected crop comprising the steps of:
  logging data from a moisture sensor for monitoring the moisture content of the collected crop and from a mass flow rate sensor for monitoring the mass flow rate of crop material fed into said harvesting machine while collecting crop from the field;
  deriving the actual moisture content of the collected crop from the combined data from said moisture sensor and from said mass flow rate sensor;
  logging data from a location device for locating the position of said harvesting machine in the field while collecting crop from said field; and
  establishing a map showing locations where said derived moisture content exceeds a threshold level, thereby indicating of the presence of weed infestation in the collected crop.

12. The method of claim 11 wherein said deriving step includes the steps of
  monitoring the signal from the moisture sensor and deriving therefrom a raw moisture content value;
  monitoring the signal from the mass flow rate sensor and deriving therefrom a mass flow rate value; and
  dividing the raw moisture content value by a factor which is proportional to the mass flow rate value.

13. The method of claim 12 wherein said moisture sensor includes a pair of opposing sensor plates mounted such that the collected crop is fed between said opposing sensor plates inside a conveyor housing of the harvesting machine, said step of logging data from a moisture sensor including the step of:
  monitoring the conductivity of the crop fed into the harvesting machine by measuring the electrical current flowing between said sensor plates via the collected crop.

14. A method of measuring moisture content of crops being harvested by a harvesting machine having a crop harvesting header for collecting crops from a field and feeding the collected crops into a crop processing mechanism that processes the collected crop comprising the steps of:
  monitoring the conductivity of the crop fed into the harvesting machine by a moisture sensor including at least one sensor plate mounted inside a conveyor housing of the harvesting machine;
  logging data from said moisture sensor and from a mass flow rate sensor for monitoring the mass flow rate of crop material fed into said harvesting machine while collecting crop from the field;
  monitoring the signal from the moisture sensor and deriving therefrom a raw moisture content value;
  monitoring the signal from the mass flow rate sensor and deriving therefrom a mass flow rate value; and
  dividing the raw moisture content value by a factor which is linearly proportional to the mass flow rate value; and
  establishing a map representative of the derived moisture content at several locations in said field based on said logged data.

15. The method of claim 14 wherein said step of monitoring the conductivity of the crop includes the step of:
  measuring the electrical current flowing from said sensor plate, via the collected crop, to the conveyor housing.

16. The method of claim 15 wherein said mass flow rate sensor measures the amount of power used to drive a conveyor which transports the collected crop.

17. The method of claim 15 wherein said step of establishing a map includes the step of:
  showing on said map the locations where said derived moisture content exceeds a threshold level, thereby indicating of the presence of weed in the field.

* * * * *